Feb. 25, 1947.   J. O. HUFFMAN   2,416,313
APPARATUS FOR SUCCESSIVELY DISPLAYING
THE INDIVIDUAL CARDS OF A PLURALITY
Filed May 12, 1943   4 Sheets-Sheet 2

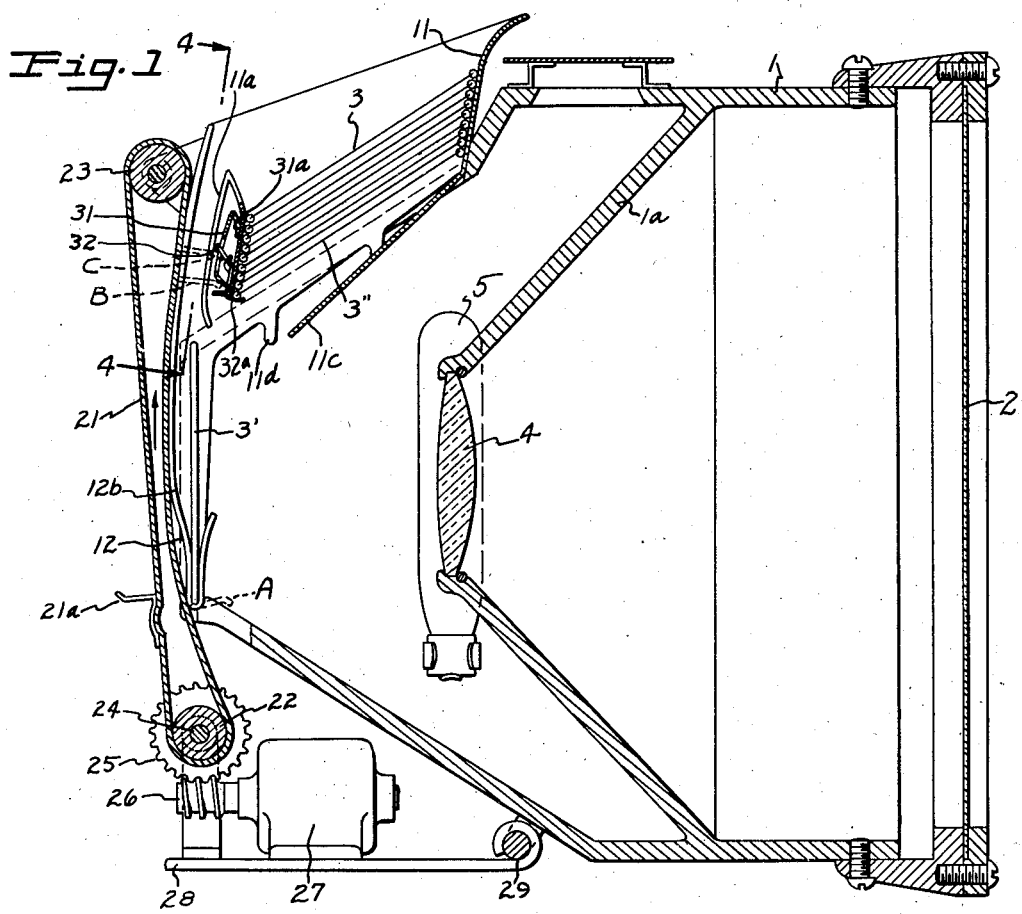
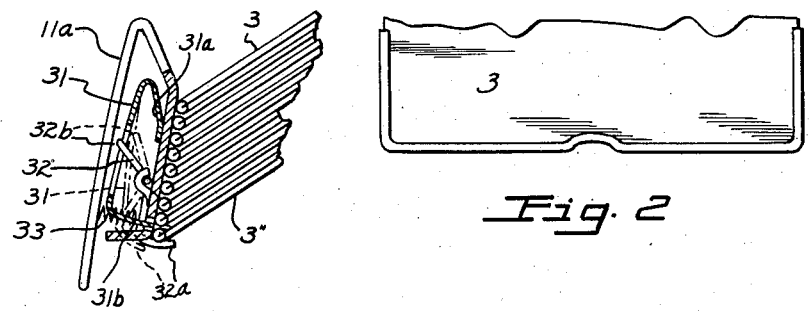

Inventor
James O. Huffman
By
William E. Hall
Atty.

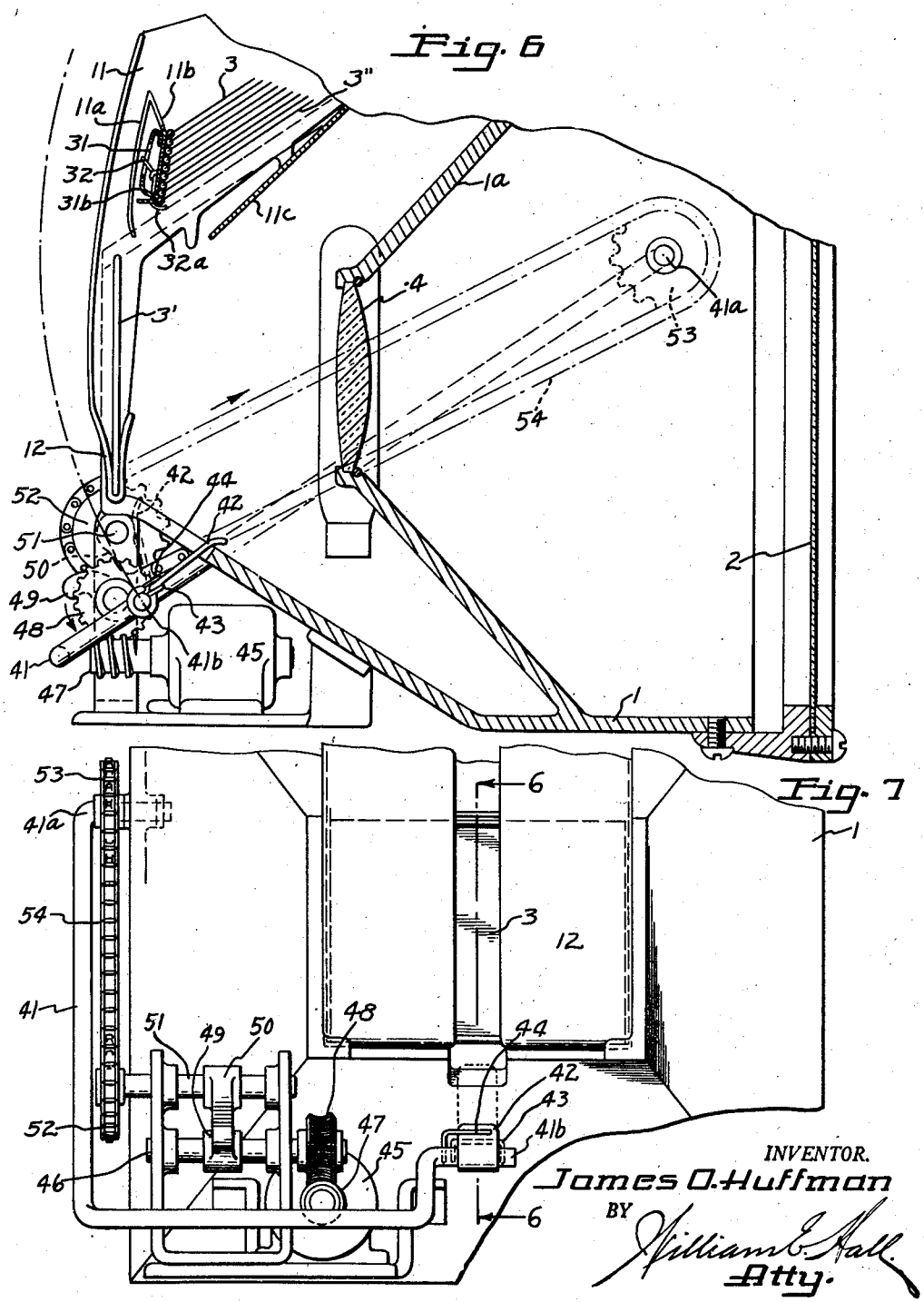

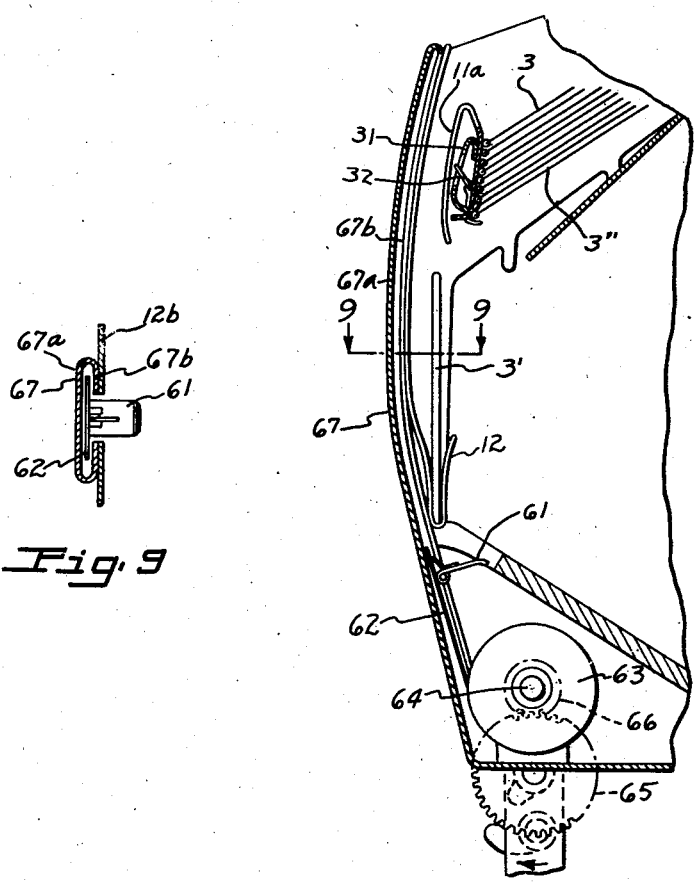

Patented Feb. 25, 1947

2,416,313

UNITED STATES PATENT OFFICE 2,416,313

APPARATUS FOR SUCCESSIVELY DISPLAYING THE INDIVIDUAL CARDS OF A PLURALITY

James O. Huffman, Los Angeles, Calif.

Application May 12, 1943, Serial No. 486,693

6 Claims. (Cl. 40—36)

My present invention relates to a display apparatus for advertising, educational and other purposes. This application is a continuation of my co-pending application, filed May 25, 1942, Serial No. 444,453, for Viewscope.

One of the principal objects of this invention is to provide an apparatus of this class whereby each of a plurality of separate display members, cards, or other devices may be successively and periodically shown on preferably an enlarged scale.

Another important object of this invention is the provision of a display apparatus of this class which is particularly compact, so that it occupies relatively little space notwithstanding the presentation of relatively large displays or images of the cards, devices, or other objects desired to be shown.

A further important object of this invention is to provide a novel method of removing periodically and in sequence the members, cards, objects, or devices desired to be displayed by the apparatus, from the storage space provided therefor, and in like manner conveying them to and placing the same in the desired display position and again returning the same to the storage place.

An important object also is the provision of simple and novel mechanisms for carrying out the above method.

With these and other objects in view, as will appear hereinafter, I have devised a display apparatus having certain novel features of construction, combination and arrangement of parts and portions, as will be hereinafter described in detail and particularly set forth in the appended claims, reference being had to the accompanying drawings and the characters of reference thereon, which form a part of this application, in which—

Fig. 1 is a longitudinal sectional elevation of my display apparatus in one form for displaying cards for advertising purposes, the section being taken at 1—1 of Fig. 5;

Fig. 2 is a fragmentary enlarged view of the lower portion of one of the display cards;

Fig. 3 is an enlarged view, similar to that shown in Fig. 1, of a portion of the display card hopper and the means for holding the cards therein and releasing the same therefrom;

Fig. 6 is a fragmentary sectional side view of a modified form of the display card transferring mechanism of my display apparatus, a view similar to that of Fig. 1, but the section being taken on the line 6—6 of Fig. 7, the dot and dash lines showing diagrammatically the portion of the chain behind the housing;

Fig. 7 is a fragmentary rear elevation of my display apparatus with the modified transferring mechanism shown in Fig. 6, the drive chain being shown diagrammatically for simplicity of illustration;

Fig. 8 is a fragmentary section elevation, similar to that shown in Fig. 6, but of still another modified form of construction of the display card transferring mechanism; and, Fig. 9 is a sectional view, taken through 9—9 of Fig. 8, showing the guide means for the card carrier and tripping means.

Figure 4:
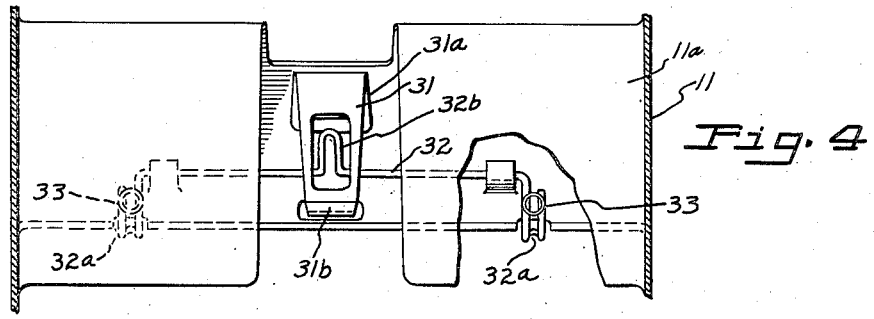
Fig. 4 is a fragmentary elevational view of the mechanism shown in Fig. 3 with the section taken at 4—4 of Fig. 1.
Figure 5:
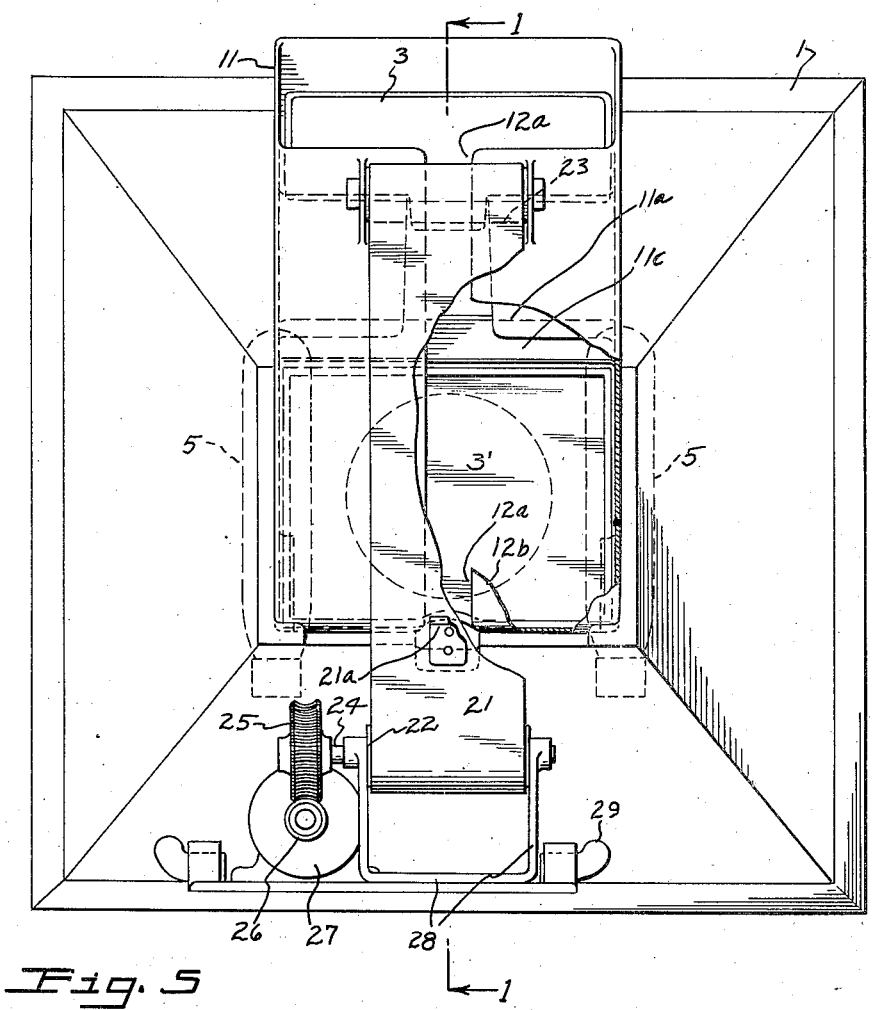
Fig. 5 is a rear elevational view of the structure as shown in Fig. 1.

My display apparatus, as shown in Figs. 1, 4, and 5, is carried on a frame 1, which forms substantially an enclosure for the display means. This frame or enclosure is provided at its front wall with a display-viewing portion in the form of a translucent screen 2. Upon this screen is projected the matter or information appearing on one of the display cards 3, shown best in Figs. 1, 2, and 5.

At the upper and rear portion of the enclosure is a display card supporting rack 11, which is in the form of a hopper, for holding a stack of display cards 3. The cards are held in a downwardly and backwardly inclined position in this hopper for the purpose hereafter described.

Behind and in alignment with the screen 2 is a card holder 12 for supporting one card 3 from the hopper 11 in an upright position in alignment with the screen 2, this card being designated 3'.

Within the enclosure is mounted an enlarging lens 4 which is arranged in the focal axis between the card 3' and the screen 2. The lens 4 is arranged at the apex of inclined converging walls 1ª, said walls diverging from the lens toward the screen and the walls of the surrounding enclosure 1. At the sides of the lens 4 are electric lamps 5 for illuminating the card 3' which is to be projected upon the screen.

It is obvious that various lighting effects or light of various colors, or luminous or fluorescent cards, or even such screen, may be provided to provide novel effects of the advertising cards or other devices, members, or objects desired to be displayed.

In Figs. 1, 3, 4, and 5, I have shown a means for conveying or transferring such display cards from the holder 12 to the top of the stack in the hopper 11, and also means for transferring or to facilitate the transfer of the bottom or lowermost card in the hopper 11 to the holder 12. An important element of such means is shown as a continuous belt 21 which extends around pulleys 22 and 23, mounted on horizontal axes, and located, respectively, directly below the holder 12 and behind the upper portion of the hopper 11. The pulley 22 is mounted on a shaft 24 which carries a worm gear 25. This worm gear meshes with and is driven by a worm 26 secured directly to a motor 27. The motor is shown carried on a table 28 which may be raised and lowered readily when a greater than the intended load is carried by the belt 21, or to compensate for variation in the belt length. For this purpose, the table is pivotally mounted at one edge on a hanger 29 at the rear and lower portion of the enclosure 1.

The belt 21 carries an obstruction in the form of a laterally extended arm or projection 21a. This projection is so arranged that when the near portion of the belt is moved upwardly, as indicated by the arrows, the projection engages the lower edge of the card 3' in the holder 12, as indicated by dotted lines, designated A, and carries this card upwardly so that it drops on top of the stack of cards in the hopper. To allow passage of the projection 21a, there is provided a wide vertical slot 12a in the holder 12, as shown best in Fig. 5. The portions of the sides of or forming the slot 12a provide guides 12b for guiding the card 3' to the upper portion of the hopper. The rear portion of the hopper also forms guides 11a at the front portion of the path taken by the upwardly moving card 3', as shown best in Fig. 1.

The portion of the hopper carrying the guide 11a forms an enclosure 11b for the card retaining, tripping, and releasing mechanism for the cards in the hopper 11. One element of this mechanism, as shown, consists of a leaf spring member 31, the upper portion 31a of which is secured at the rear wall of the hopper and the free end of which extends downwardly. The free end is provided with a card separating portion 31b which is so positioned that it may be forced between the lowermost and the next upper card, as shown best in Fig. 3. Within the enclosure 11b and on the rear wall of the hopper is pivoted a wire rocking member 32 which is provided near its ends with hook or retaining portions 32a which are normally positioned below the lower edge of the lowermost card, designated 3''. The intermediate portion 32b of the rocking member 32 extends upwardly and backwardly, as an actuating or tipping arm, as shown best in Fig. 3. As the arm or projection 21a of the conveyor belt raises the card 3' from the holder 12, and before the card 3' is deposited in the hopper 11, this projection engages the free end of the member 31 and forces the card separating portion 31b of the retaining member between the two lower cards. The position of the projection 21a for effecting this result is shown by dotted lines designated B. As the projection is raised still higher, it engages, as indicated by the dotted line position, designated C, the end of the tripping arm 32b of the rocking or spring member 32, causing tripping or rocking thereof in a clockwise direction and releasing the lowermost card 3''. This is permitted to drop by gravity on a deflecting portion 11c at the bottom of the hopper. This deflecting portion will cause the card 3'' to assume a rearwardly and downwardly directed path so that it will drop into the holder 12. The card 3'' will then be in a position to be projected upon the screen 2.

It will be noted of course that it is desired to operate the belt 21 at a relatively slow speed so that the cards in the hopper 11 will be successively deposited in the holder 12 at such periods as to allow the viewer of the screen to discern the contents of the card. It will be here noted that the hopper 11 and the holder 12 may be made very simply of one piece of sheet metal if desired. The deflecting plate 11c may also be formed of the same member, as well as guides 11d extending downwardly from the sides of the hopper.

Figs. 6 and 7 of the drawings show a modified form of the mechanism for returning the display card 3', in the holder 12 to the top of the hopper 11, and at the same time tripping the release for allowing the lowermost display card 3'' in the hopper, to be transferred to or dropped into the holder. This mechanism consists primarily of an arm 41, one end of which is here shown as pivoted at 41a at the side of the housing or enclosure 1 of the apparatus. The free end of the arm or lever is provided with a right angle or transversely bent portion which is provided at the free end 41b thereof with a carriage formed primarily of a dog 42, this dog being pivoted at said end, as shown in Figs. 6 and 7. This dog, during its normal operation or card-carrying position, may lie substantially flat or coplanar with the carrying arm 41, and is held in such position by a U-shaped retaining member 43, and is resiliently forced in such position by a spring 44. The dog is held in the last named position when the free end of the arm or lever 41 is raised, but the dog 42 is feathered with respect to the direction or movement when the lever is lowered or returned to its original position.

The function of the arm is similar to that of the belt 21 described above, and that of the dog 42 the same as the projection 21a described above. If the lever is raised, the card 3' in the holder 12 is raised and deposited in the hopper, and the dog 42, in this modification, also operates to force the card-separating portion 31b of the member 31 between the two lower cards, and further rocks the member 32 in order to permit the lowermost card 3'' to drop into the holder. On the down stroke of the arm 41 none of these members are moved because the dog 42 is allowed to feather.

The arm 41 is rocked upwardly or raised by a motor 45 which rotates a shaft 46 through a worm 47 and a worm gear 48. The shaft 46 has a cam 49 which, during a portion of its circular movement, is adapted to engage the free end of another cam 50 mounted on a shaft 51. This shaft is operatively connected with the pivotal end 41a of the lever 41 through sprockets 52 and 53 connected by a chain 54. In this manner rotary motion of the motor 45 causes uniform circular movement of the lever 41, but after the free portion of the cam 49 has moved free of the cam 50 through a designated arc, the lever 41 is allowed to drop to its original position.

In Figs. 8 and 9 of the drawings, the card 3', in the holder 12, is raised, and the members 31 and 32 are operated by means similar to that described in the two structures above, but in this instance the carriage consists of a projection or dog 61, which is a pivoted arm, similar to that shown in Figs. 6 and 7, is provided at the free end of a flexible member or arm 62. This flexible arm may be a band of very flexible and resilient metal which is normally rolled and retractably held in a casing 63. The drum 64 upon which the band 62 is adapted to be rolled, may be operated by a mechanism similar to that shown in Figs. 6 and 7 for moving the arm 41, except that there may be provided an increased speed gearing shown by gears 65 and 66 between the cams and the drum 64. In this instance, the free end of the flexible arm or band 62 is guided in its upward movement by and within an arcuate guide means 67, this guide means consisting of radially spaced apart plates 67ᵃ and 67ᵇ. There are two laterally spaced apart plates 67ᵃ which permit the projection 61 to move therebetween. The projection or dog 61 is also mounted on the free end of the flexible arm or band 62 so that it may be feathered when returning to its original position, whereby the members 31 and 32 remain unaffected when the projection or dog 61 moves downwardly.

Though I have shown and described a particular construction, combination, and arrangement of parts and portions of my display apparatus, and have disclosed certain modifications showing some of the operating elements, I do not wish to be limited to the same, but desire to include in the scope of my invention the construction, combination, and arrangement substantially as set forth in the appended claims.

I claim:

1. In a display apparatus of the class described, an enclosure having a viewing portion at one end, a hopper at the rear and upper portion of said enclosure, said hopper being capable of storing display cards in downwardly and backwardly inclined positions, a holder positioned below said hopper and behind the viewing portion for holding a display card in line with the latter, and conveying means for removing the display card from the holder and conveying the same to the top of the hopper, said hopper having a release means movably mounted at the bottom thereof for supporting the lowermost display card in the hopper, and said conveying means being capable of tripping said release means for allowing the lowermost display card in the hopper to be discharged therefrom for the holder.

2. In a display apparatus of the class described, an enclosure having a viewing portion at one end, a hopper at the rear and upper portion of said enclosure, said hopper being capable of storing display cards in downwardly and backwardly inclined positions, a holder positioned below said hopper behind and in line with the viewing portion, and a continuous belt conveyor positioned behind the holder and extending from below the same to the hopper, said conveyor having a projection for engaging the bottom portion of the display card in the holder and conveying the same to the top of the hopper, said hopper having a release capable of being operated by said projection for releasing the lowermost display card in the hopper for the holder.

3. In a display apparatus of the class described, a frame having a viewing portion, a hopper at the upper portion of the frame, said hopper being capable of storing display members, a holder positioned below said hopper for holding a display member in viewing relation to the viewing portion, and conveying means for removing the display member from the holder and conveying the same to the top of the hopper, said hopper having a release movably mounted at the bottom thereof, said conveying means being capable of operating said release means to facilitate the removal of the lowermost display member from the hopper.

4. In a display apparatus of the class described, a frame having a viewing portion, a hopper at the upper portion of the frame, said hopper being capable of storing display members, a holder positioned below said hopper for holding a display member in viewing relation to the viewing portion, said conveying means having a projection for engaging the bottom portion of the display member in the holder for conveying the same to the top of the hopper, said hopper having a release capable of being operated by said projection for releasing the lowermost display member in the hopper for depositing the display member in the holder.

5. In a display apparatus of the class described, a frame, a rack for holding a plurality of display members, said rack having at one end a spring member secured at its upper end to the rack and extending with its free end downwardly, the free end having a laterally extended portion adapted to be shifted towards the rack above the bottom thereof, a retaining member pivotally mounted intermediate its ends at the outer side of the rack above the free end of the laterally extended portion of the spring member, the one end of the retaining member also having a laterally extended portion positioned normally below one end of the rack, said retaining member having an arm extending outwardly from its pivoted portion, and means adapted to force the laterally extended portion of the spring member into said rack between the lowermost display member and adjacent display member in the rack, said means sequentially rocking said retaining member about its pivotal axis for withdrawing its laterally extending portion from the rack and thereby permitting the lowermost display member to drop from said rack.

6. In a display apparatus of the class described, a frame, a rack for holding a plurality of display members, said rack having at one end a spring member secured at its upper end to the rack and extending with its free end downwardly, the free end having a laterally extended portion adapted to be shifted towards the rack above the bottom thereof, a retaining member pivotally mounted intermediate its ends at the outer side of the rack above the free end of the laterally extended portion of the spring member, the one end of the retaining member also having a laterally extended portion positioned normally below one end of the rack, said retaining member having an arm extending outwardly from its pivoted portion, a holder for receiving a display member below the rack, and means for removing the latter display member from the holder and conveying the same to the top of the rack, said means being adapted to force the laterally extended portion of the spring member into said rack between the lowermost display member and adjacent display member in the rack, said means sequentially rocking said retaining member about its pivotal axis for withdrawing its laterally extending portion from the rack and thereby permitting the lowermost display member to drop from said rack into the holder.

JAMES O. HUFFMAN.

REFERENCES CITED

The following references are of record in the file of this patent:

UNITED STATES PATENTS

| Number | Name | Date |
| --- | --- | --- |
| 1,165,318 | Carver | Dec. 21, 1915 |
| 1,167,399 | Gillam | Jan. 11, 1916 |
| 1,247,608 | Alguire | Nov. 27, 1917 |